(12) United States Patent
Nagarathnam

(10) Patent No.: US 11,990,152 B2
(45) Date of Patent: May 21, 2024

(54) CLASSIFICATION OF AUDIO AS ORIGINATING FROM A HUMAN SOURCE OR A NON-HUMAN TO AVOID FALSE WAKE-WORD DETECTION

(71) Applicant: ARRIS Enterprises LLC, Suwanee, GA (US)

(72) Inventor: Yuvaraj Nagarathnam, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/512,924

(22) Filed: Oct. 28, 2021

(65) Prior Publication Data

US 2022/0157333 A1 May 19, 2022

Related U.S. Application Data

(60) Provisional application No. 63/113,535, filed on Nov. 13, 2020.

(51) Int. Cl.
| | |
|---|---|
| *G10L 25/78* | (2013.01) |
| *G06V 40/10* | (2022.01) |
| *G10L 15/00* | (2013.01) |
| *H04W 4/02* | (2018.01) |

(52) U.S. Cl.
CPC ............ *G10L 25/78* (2013.01); *G06V 40/10* (2022.01); *G10L 15/00* (2013.01); *H04W 4/02* (2013.01); *G10L 2025/786* (2013.01)

(58) Field of Classification Search
CPC .......................... G10L 25/78; G10L 2025/786
See application file for complete search history.

(56) References Cited

U.S. PATENT DOCUMENTS

| | | | |
|---|---|---|---|
| 8,265,341 B2* | 9/2012 | Dernis .................... | A63F 13/79 |
| | | | 379/88.01 |
| 9,530,426 B1* | 12/2016 | Wright .................... | H04S 7/302 |
| 10,206,036 B1* | 2/2019 | Feng ..................... | G06V 40/161 |
| 10,681,313 B1* | 6/2020 | Day ...................... | G06V 40/172 |
| 2017/0109613 A1* | 4/2017 | Kolavennu ............. | G06V 10/60 |
| 2017/0215019 A1* | 7/2017 | Chen ..................... | G10L 21/038 |
| 2018/0047394 A1* | 2/2018 | Tian ....................... | G10L 15/24 |
| 2018/0286404 A1* | 10/2018 | Cech ..................... | G10L 15/25 |
| 2018/0329020 A1* | 11/2018 | Hafizovic ............. | G06V 10/764 |
| 2022/0345813 A1* | 10/2022 | Stein .................... | H04N 13/271 |

* cited by examiner

*Primary Examiner* — Bryan S Blankenagel
(74) *Attorney, Agent, or Firm* — Wenderoth, Lind & Ponack, L.L.P.

(57) ABSTRACT

An audio processing device that determines a correlation between a location of a source of the audio signal associated with the audio command, and a human positioned at the location of the source of the audio signal associated with the audio command. The audio command is identified as originating from the human positioned at the location based on the position data and the location of the source of the audio signal associated with the audio command correlating. Based on identifying the audio command as originating from the human positioned at the location, the audio command is executed.

20 Claims, 6 Drawing Sheets

CLASSIFICATION OF AUDIO AS ORIGINATING FROM A HUMAN SOURCE OR A NON-HUMAN TO AVOID FALSE WAKE-WORD DETECTION

BACKGROUND

The subject matter of the present disclosure relates generally to using position data of humans in the environment in combination with determination of voice source location to classify whether a voice command has originated from a human source.

Speech activity detection system uses voice source location data to aid in receiving the commands clearly, filtering out the environmental noise and unwanted sources of sound. Such techniques such as spatial filtering is used for spatial steering of the received data, at the post processing stage of processing the audio data, which helps the voice (command) detection process by avoiding data from undesired spatial segments containing noise and unwanted data.

Data associated with the origination of the voice (voice source data) is used to direct the microphone array to beamform the reception towards the direction of the voice source. This method of beamforming at the post processing stage helps in receiving the users command clearly. The same sound source localization technique is also used for tracking the moving audio source. There are various sound source localization techniques, such as using the energy level of the voice signal, TDOA (time difference of arrival), Direction of arrival estimates, Time Of Arrival (TOA), etc.

Wireless positioning system uses one or combination of RSSI, AOA (angle of arrival), Time for Turn around Trip (TTA), CSI (Channel state Information), wireless passive radar positioning data, Wi-Fi based indoor positioning data, or other methods to obtain location of humans in the environment. A wireless sensor network (WSN) is used for indoor positioning system. Wireless positioning systems may be active tracking systems where the user is tracked by a wireless device that the user carries, or passive tracking systems where the user does not carry any wireless device.

Voice assistants, also referred to as digital virtual assistants, perform tasks or services for an individual based on verbal commands or questions. Voice assistants react to voice commands and give the user relevant information about the command. A Wake-Word is usually spoken first and then the verbal command is given. Presently voice assistants are already able to place orders of products, answer questions, and perform actions, such as turning on/off lights, setting a temperature on a digital thermostat, playing music, or initiating a phone call. Voice assistants use natural language processing (NLP), artificial intelligence (AI), and voice recognition to respond to verbal commands. The usage of voice assistants continues to grow as users become more comfortable with interacting with them.

There are still some technical problems associated with voice assistants. For example, voice assistants cannot distinguish between an authorized user's verbal command and a voice on a television or a verbal command from an unauthorized user. As a result, voice assistants are vulnerable to hackers and false verbal commands, such as an advertisement on a television or other audio device. To address this issue, current methods for classifying voice sources uses signatures extracted from the voice. However, classifying a command as originating from a human or a non-human has proven to be difficult because a recorded voice has the same signature (feature) as is in the case of a voice originating from a human-being. Further, these techniques require storing all active advertisements and requires running algorithms to extract voice signatures from every voice command that is sent from the voice-assistant to the bank-end processing system, which may be installed using cloud computing infrastructure. Then an algorithm runs a code to compare the extracted signature from the voice command with the signatures from the list of stored advertisements. This is a complex process and requires a lot of computing power. In addition, this technique needs tracking all live advertisements across the world and updating the database which needs a lot of logistics. With voice assistant devices penetrating across various regions of the world where different languages are spoken, tracking all advertisements and comparing every command that comes from the user is becoming increasingly difficult.

SUMMARY

An aspect of the present disclosure involves using correlation between position data of humans in the environment and the determination of voice source location to classify whether a voice command has originated from a human or a non-human source.

An audio processing device includes a voice source processing system for generating voice source data from an audio signal associated with an audio command, and a positioning system for receiving position data associated with a position of a human. The audio processing device also includes a memory storing computer-readable instructions; and a processor configured to execute the computer-readable instructions to process the voice source data to determine a location of a source of the audio signal associated with the audio command, process the position data to identify whether a human is positioned at the location of the source of the audio signal associated with the audio command, determine that the position data and the location of the source of the audio signal associated with the audio command correlate, based on determining that the position data and the location of the source of the audio signal associated with the audio command correlate, identify that the audio command originates from the human positioned at the location, and based on identifying the audio command as originating from the human positioned at the location, execute the audio command.

The positioning system includes one or more of a wireless positioning system that uses wireless signals to determine when the human is positioned at the location, and an imaging positioning system that captures image data for identifying when the human is positioned at the location.

The processor determines that the position data and the location of the source of the audio signal associated with the audio command correlate by dividing an area around the location of the source of the audio signal into three-dimensional (3D) block regions, determining, from the voice source data, a probability of a sound source at location $R_n$ is greater than a threshold of the probability of the sound source being at location $R_n$; and determining, from the position data, a probability of the human being positioned at region $R_n$ is greater than a threshold of probability of the human is at the sound source at location $R_n$.

The processor further determines that the position data and the voice source data do not correlate, identifies that the audio command originates from a non-human source based on determining that the position data and the location of the source of the audio signal associated with the audio command does not correlate, and discards the audio command.

The processor determines that the position data and the voice source data do not correlate by dividing an area around the location of the source of the audio signal into three-dimensional (3D) block regions, and determining, from the voice source data, a probability of a sound source is at location $R_n$ and, from the position data, a probability of the human being positioned at region $R_n$, wherein at least one of the probability of the sound source at location $R_n$ is not greater than a threshold of the probability of the sound source being at location $R_n$ or the probability of the human at region $R_n$ is not greater than a threshold of probability of the human is at the sound source at location $R_n$.

The processor determines that the audio signal is not from a human source by dividing an area around the location of the source of the audio signal into three-dimensional (3D) block regions, processing the audio signal to calculate a probability of a sound source at a first of the 3D block regions, ignoring 3D block regions with a probability of presence of source of sound at the first of the 3D block regions that is less than a probability threshold of the sound source being at the first of the 3D block regions, determining that two of the 3D block regions meet three conditions, a first condition is determined to occur when an angle between the two of the 3D block regions is greater than an angle threshold, a second condition is determined to occur when a probability of the sound source originating from the two of the 3D block regions is greater than a probability threshold of the sound source being in the two of the 3D block regions, and a third condition is determined to occur when a command signature from the two of the 3D block regions satisfies the first condition and the second condition, and determining, based on the three conditions being met, that the audio signal originates from a non-human source.

The processor processes the audio command when at least one of the first condition, the second condition, and the third condition is not met, and wherein the angle threshold is calculated based on a minimum distance expected between two audio sources.

The processor determines that the position data and the voice source data correlate by processing location data received from the positioning system using a position estimator and processing the voice source data receive from the voice source processing system using a sound source estimator.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

Aspects of the present disclosure are directed to processing position data and location of the source of the audio signal associated with the audio command to determine a correlation between the two, and based on determining the correlation, identifying that the audio command originates from the human positioned at the location. When the audio command is determined to originate from the human positioned at the location, the audio command is executed.

Figure 1:
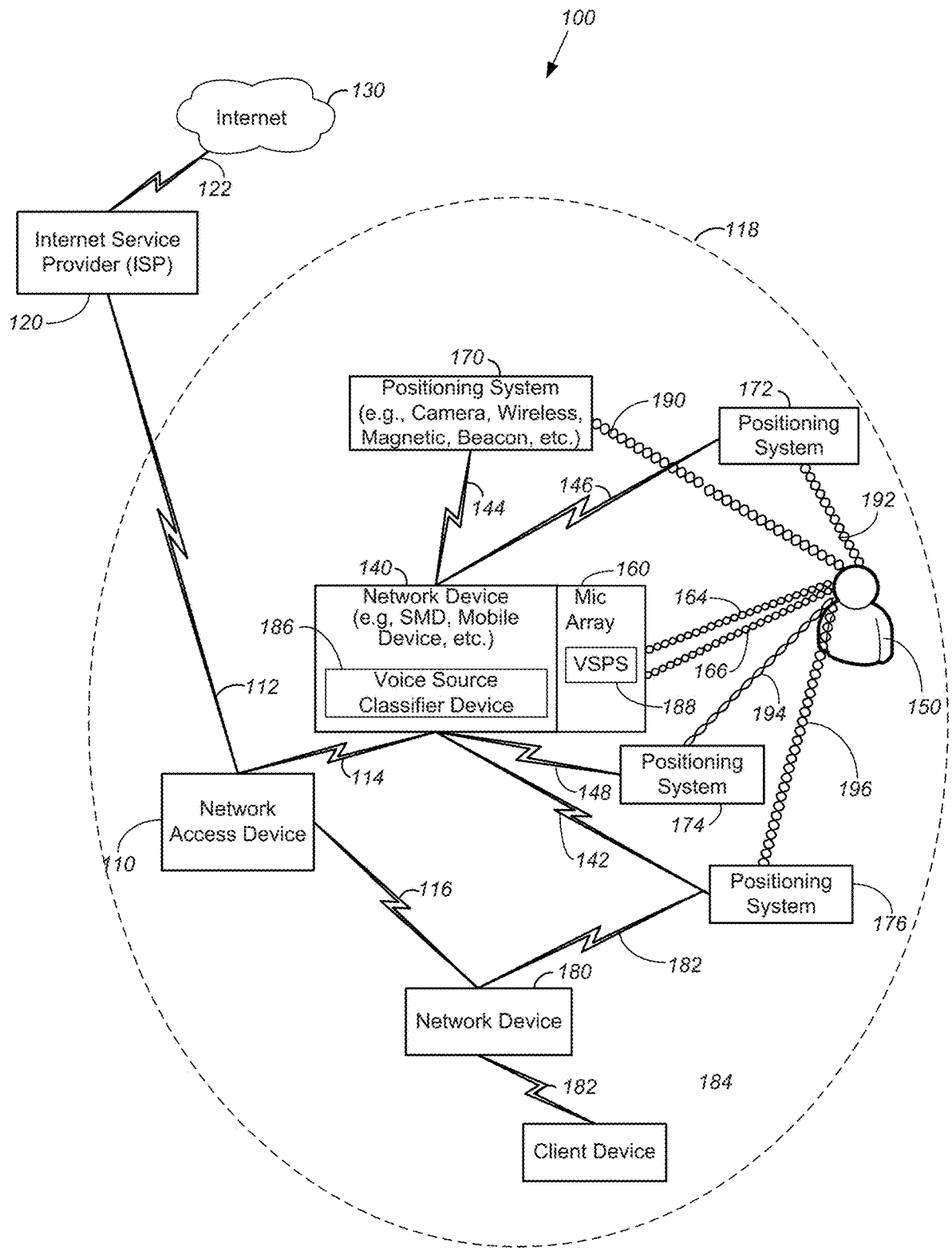
FIG. 1 is a schematic diagram of a system.

FIG. 1 is a schematic diagram of a system 100.

As shown in FIG. 1, the elements of the system 100 include a Network Access Device 110 connected to the Internet 130 via an Internet Service Provider (ISP) 120 and also connected to different wireless devices such as Network Devices 140, 180. Client Device 184 is connected to Network Device 180. User 150 may be located in an area near Network Device 140. Network Devices 140, 180 may, for example, be a Smart Media Device, a Mobile Device, or other device. Network Devices 140, 182 may include a Voice Source Classifier Device 186 and a microphone array 160. Microphone array 160 may receive audio signals 164, 166 associated with an audio command from user 150. Client Device 184 may be a desktop computer, a laptop computer, an electronic tablet device, a smart phone, an appliance, or any other so-called Internet of Things equipped device that is equipped to communicate information via WLAN. System 100 also includes Positioning Systems 170, 172, 174, 176 that receive position data 190, 192, 194, 196, for example, associated with a position of User 150.

Network Devices 140, 180, Client Device 184, and Positioning Systems 170, 172, 174, 176 may be connected in one or more wireless networks 118 (e.g., private, guest, iControl, backhaul network, or Internet of things (IoT) network) within the system 100. Additionally, there could be some overlap between Network Devices 140, 180, Client Device 184, and Positioning Systems 170, 172, 174, 176 in different networks. That is, one or more network access devices 110 could be located in more than one network. For example, Network Device 140 could be located both in a private network and also included in a backhaul network or an iControl network.

Starting from the top of FIG. 1, the ISP 120 can be, for example, a streaming video provider or any computer for connecting the Network Access Device 110 to the Internet 130. The connection 122 between the Internet 130 and the ISP 120 and the connection 112 between the ISP 120 and the Network Access Device 110 can be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

Connections 112, 122 can further include as some portion thereof a broadband mobile phone network connection, an optical network connection, or other similar connections. For example, the connection 112 can also be implemented using a fixed wireless connection that operates in accordance with, but is not limited to, 3rd Generation Partnership Project (3GPP) Long Term Evolution (LTE) or 5G protocols. It is also contemplated by the present disclosure that Connection 112 is capable of providing connections between the Network Access Device 110 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example. It is also contemplated by the present disclosure that the Network Access Device 110 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

Connections 114, 116, 142, 144, 146, 148, 182 between the Network Access Device 110, Network Devices 140, 180, Client Device 184, and Positioning Systems 170, 172, 174, 176 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Connections 114, 116, 142, 144, 146, 148, 182 may be a wired connection such as a wired Ethernet connection. Additionally, the connections 114, 116, 142, 144, 146, 148, 182 may also be implemented through a WAN, a local area network (LAN), a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. Connections 114, 116, 142, 144, 146, 148, 182 may further be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connection 114 can include connections to a media over coax (MoCA) network.

Client Device 184 can be, for example, a hand-held computing device, personal computer, electronic tablet, smart phone, smart speaker, IoT device, iControl device, portable music player with smart capabilities capable of connecting to the Internet, cellular networks, and interconnecting with other devices via Wi-Fi and Bluetooth, or other wireless hand-held consumer electronic devices capable of executing and displaying content received through the Network Access Device 110 and Network Devices 140, 180. Additionally, Client Device 184 can be a TV, an IP/QAM STB or an SMD that is capable of decoding audio/video content, and playing over over-the-top (OTT) or MSO provided content received through the Network Access Device 110.

Network Device 140 may include a Voice Source Processing System (VSPS) 188 for generating voice source data from audio signals 164, 166 associated with an audio command received from User 150. Positioning Systems 170, 172, 174, 176 receive position data 190, 192, 194, 196 associated with a position of User 150. The voice source data derived from audio signals 164, 166 associated with an audio command received from User 150 are used to determine a location of a source of the audio signals 164, 166. The position data 190, 192, 194, 196 is used to identify whether a human is positioned at the location of the source of the audio signal, e.g., User 150.

The Voice Source Classifier Device 186 determines that the position data 190, 192, 194, 196 and the location of the source of the audio signals 164, 166 associated with the audio command correlate. Based on determining that the position data 190, 192, 194, 196 and the location of the source of the Audio Signals 164, 166 associated with the audio command correlate, identifying that the audio command provide by the Audio Signals 164, 166 originates from the human positioned at the location, e.g., User 150. Based on identifying that the Audio Signals associated with the audio command originates from User 150 at the location, the audio command is executed. One or more of Positioning Systems 170, 172, 174, 176 may be a wireless positioning system that uses wireless signals to determine when the User 150 is positioned at the location, and one or more of Positioning Systems 170, 172, 174, 176 may be an imaging positioning system that captures image data for identifying when the human is positioned at the location. When the Position Data 190, 192, 194, 196 and the voice source data from the Audio Signals 164, 166 do not correlate, the audio command is identified as originating from a non-human source. When an angle between two regions determined to be a source of sound is greater than an angle threshold, the audio signal may be determined to be from a non-human source. The angle threshold is calculated based on a minimum distance expected between two audio sources, such as a speaker as in the case with a Dolby® setup. Network Device 140 may include a position estimator for processing Position Data 190, 192, 194, 196. Voice Source Processing System (VSPS) 188 may include a sound source estimator.

Figure 2:
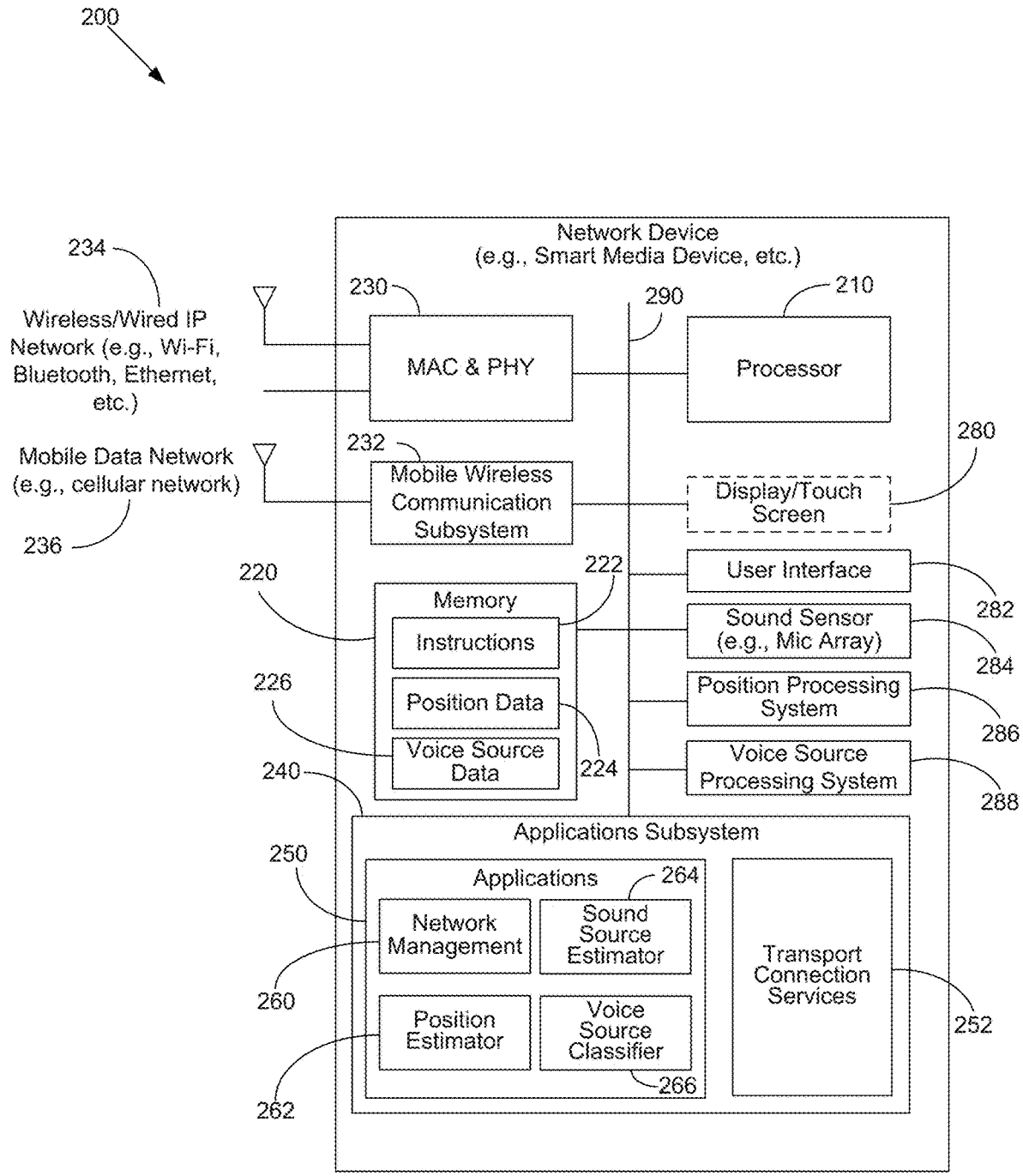
FIG. 2 illustrates a network device.

FIG. 2 illustrates a network device 200.

In FIG. 2, the Network Device 200 may be a gateway, a router, an access point, SMD, or any other device that includes audio processing for determining whether a sound source originates from a human or a non-human. Network Device 200 may include a Processor 210, Memory 220, a Media Access Controller (MAC) and Physical Transceiver (PHY) 230, Communications System 232, Applications Subsystem 240, User Interface 282, and optionally a Display/Touch Screen 280. Media access controller (MAC) and physical transceiver (PHY) 230 provides wireless and wired communication with a Wireless/Wired Internet Protocol (IP) Network 234, such as a Wi-Fi network. Communication Subsystem 232 provides communication with a Data Network 236, such as a cellular network. Not all Network Devices 200 include display/touch screen 280. However, some Network Devices 200 may allow control, management, or configuration through a web browser via User Interface 282 instead of Display/Touch Screen 280.

Memory 220 includes Instructions 222 that may be used by Processor 210 to implement functions of the Network Device 200. Memory 220 may also store Position Data 224 and Voice Source Data 226. Processor 210 may be configured to execute instructions 224 stored on said Memory 220 to cause said Network Device 200 to, for example, Wireless/Wired Network Communication 234 (such as Wi-Fi, Bluetooth, Ethernet, etc.) via Media Access Controller (MAC) and Physical Transceiver (PHY) 230 and communications via Data Network 236 using Communication Subsystem 232. Communication between the components (e.g., 210, 220, 230, 232, 240, 282) of the Network Device 200 may be established using an Internal Bus 290.

Network Device 200 includes Applications 250, and Transport Connection Services 252. Transport connection services 252 provide reliable communication between processes and involve the establishment of connections between devices. Processor 210 may implement Network Management 260 to retrieve network data for the purpose of monitoring and controlling network activity of Network Device 200.

Network Device 200 implements a Voice Source Classifier 266. Sound Sensor 284, which includes a microphone array, receives audio signals from a sound source and determines when an angle between regions associated with audio signals exceed an angle threshold. Voice Source Classifier 266 controls Position Processing System 286 and Voice Source Processing System 288. Position Processing System 286 uses Position Estimator 262 to generate position data based on wireless signals from wireless devices in the network or image data captured by imaging devices, such as a visible light camera, thermographic camera, etc. Voice Source Processing System 288 uses Sound Source Estimator 264 to process audio signals and generate Voice Source Data 226. Voice Source Data 226 may also include voice signatures derived from the audio signals. Position Data 224 and Voice Source Data 226 may be stored in Memory 220. Voice Source Classifier 266 processes Position Data 224 and Voice Source Data 226 to determine whether the Position Data 224 and the location of the Voice Source Data 226 correlate.

The Voice Source Classifier 266 may identify that the audio signals originate from a human positioned at the location based on determining that the position data and the location of the source of the audio signal associated with the audio command correlate. Based on identifying the audio signals originate from a human positioned at an identified location, the audio command derived from the audio signals is executed by Processor 210.

Certain subject matter of the present disclosure is described herein as including logic or a number of components, units, elements, or mechanisms. The Network Device 200 may constitute either software elements (e.g., code embodied on a machine-readable medium) or hardware elements. A "hardware element" is a tangible unit capable of performing certain operations and may be configured or arranged in a certain physical manner. In various example, one or more computer systems (e.g., a standalone computer system, a client computer system, or a server computer system) or one or more hardware elements of a computer system (e.g., a processor or a group of processors) may be configured by software (e.g., an application or application portion) as a hardware element that operates to perform certain operations as described herein. Processor 210 may be configured to execute computer-readable instructions maintained in Memory 220 to process Position Data 224 and Voice Source Data to determine when a human that is positioned at a determined location is a source of audio signals associated with a voice command.

Figure 3:
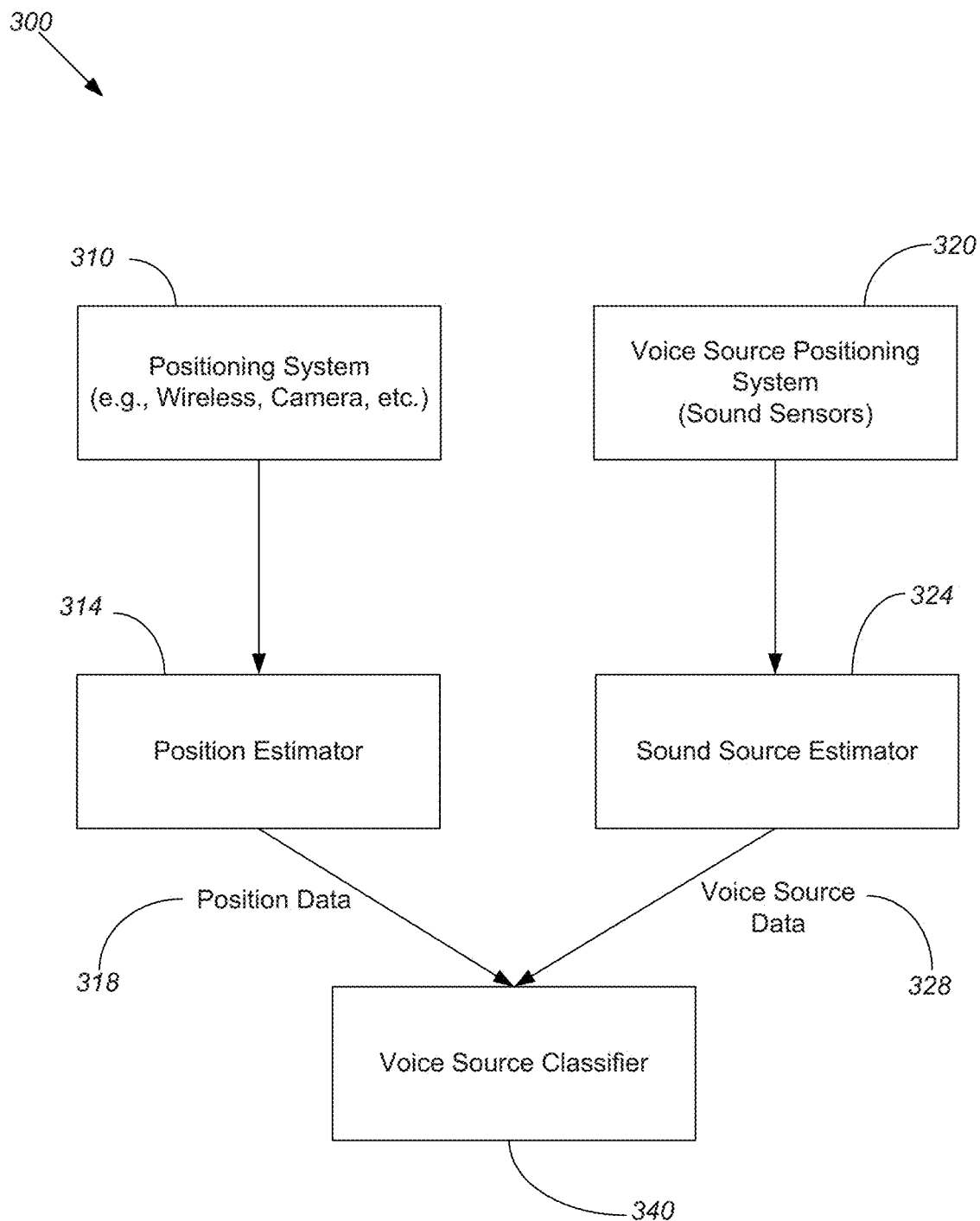
FIG. 3 illustrates a voice source classifier.

FIG. 3 illustrates a voice source classifier 300.

In FIG. 3, Positioning System 310 obtains position data associated with a position of a human when audio signals are detected. Voice Source Processing System 320 obtains voice data associated with audio signals. Position Estimator 314 uses the data from Positioning System 310 to produce Position Data 318. Sound Source Estimator 324 uses data from audio processing system to produce Voice Source Data 328. Voice Source Classifier 340 receives the Position Data 314 and the Voice Source Data 324. Voice Source Classifier 340 uses the Position Data 314 and the Voice Source Data 324 to classify if a command derived from audio signals is originating from a human source or not.

Figure 4:
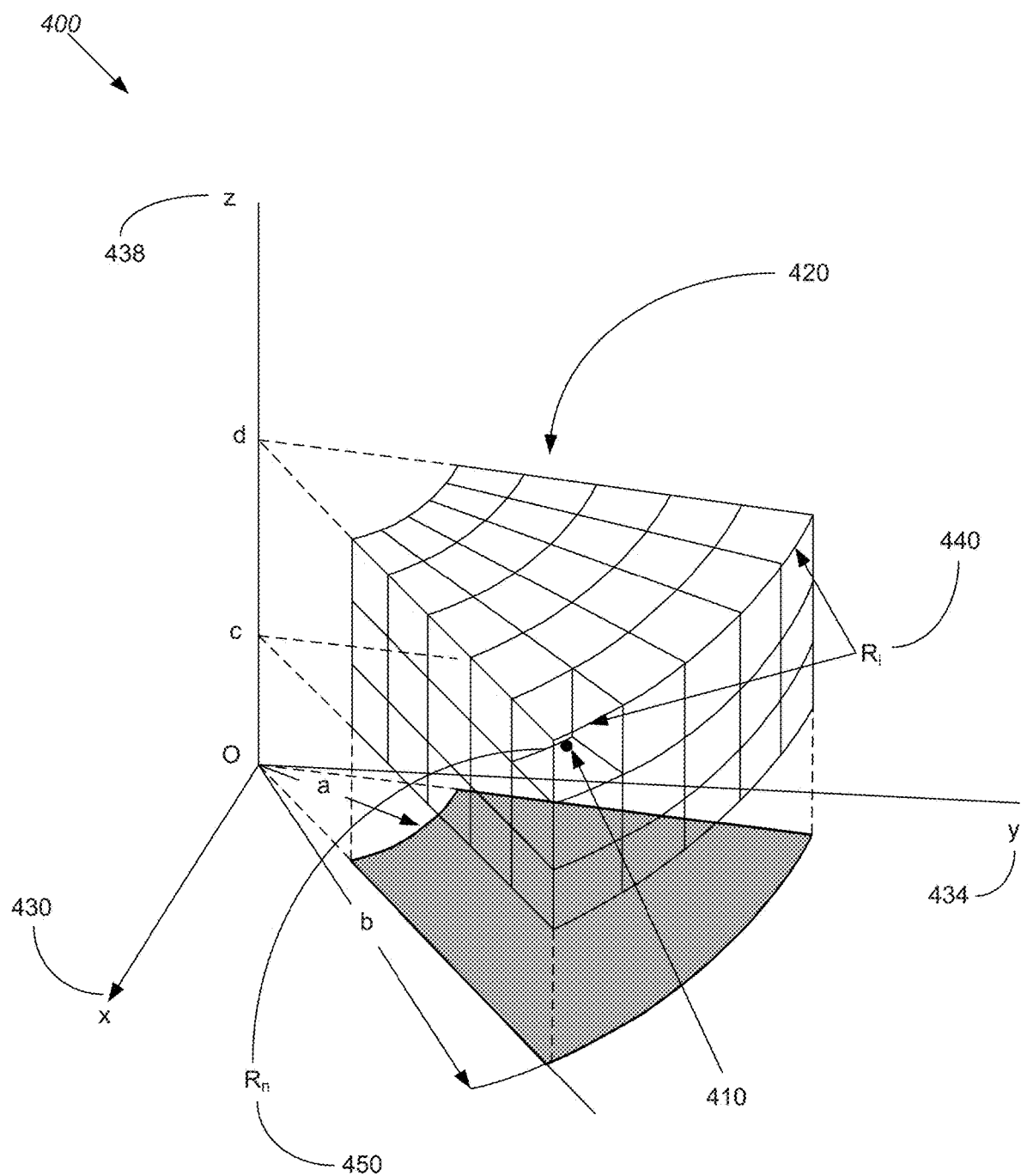
FIG. 4 illustrates an area around a source of sound being divided into regions.

FIG. 4 illustrates an area around a Source of Sound being divided into regions 400.

In FIG. 4, a source of sound 410 is located in an Area 420 defined by an x-axis 430, y-axis 434, and z-axis 438. Area 420 is divided into Three-Dimensional (3D) Block Regions, $R_i$ 440. Sound Source 410 is located in one of the 3D Block Regions, $R_i$, which will be referred to as $R_n$ 450. The Sound Source 410 may be designated as having x, y, z coordinates.

Figure 5:
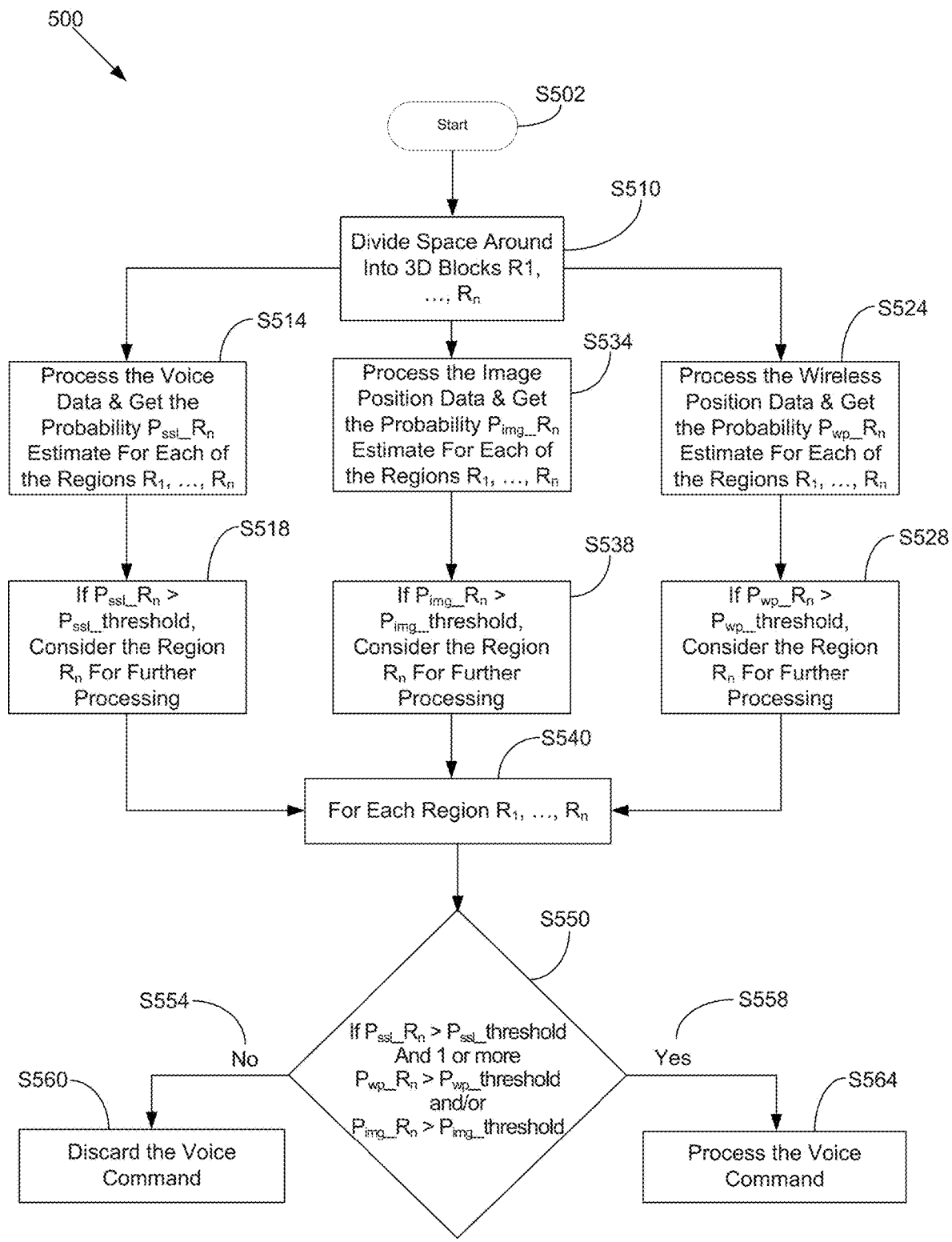
FIG. 5 illustrates a flow chart of a method for determining correlation between voice data and position data for determining whether to process or discard a voice command.

FIG. 5 illustrates a flow chart 500 of a method for determining correlation between voice data and position data for determining whether to process or discard a voice command.

In FIG. 5, method 500 starts (S502), and a space around a sound source is divided into three-dimensional (3D) blocks (S510). Referring to FIG. 4, a source of sound 410 is located in an Area 420 defined by an x-axis 430, y-axis 434, and z-axis 438. Area 420 is divided into Three-Dimensional (3D) Block Regions, $R_i$ 440. Sound Source 410 is located in one of the 3D Block Regions, $R_i$, which will be referred to as $R_n$ 450.

Voice Data is processed to obtain the probability $P_{ssl\_}R_n$ estimate for each of the 3D regions, $R_1, \ldots, R_n$ (S514). Referring to FIG. 3, Sound Source Estimator 324 uses data from audio processing system to produce Voice Source Data 328. Referring to FIG. 2, Voice Source Processing System 288 uses Sound Source Estimator 324 to process audio signals and generate Voice Source Data 226.

A determination is made whether a probability of a sound source is at location $R_n$ is greater than a threshold of the probability of the sound source being at location $R_n$: $P_{ssl\_}R_n > P_{ssl\_}$threshold (S518). Referring to FIG. 2, Voice Source Processing System 288 uses Sound Source Estimator 264 to process audio signals and generate Voice Source Data 226.

Wireless position data is processed to obtain the probability $R_{wp\_}R_n$ estimate for each of the regions, $R_1, \ldots, R_n$ (S524). One or more of Positioning Systems 170, 172, 174, 176 may be a wireless positioning system that uses wireless signals to determine when the User 150 is positioned at the location, and one or more of Positioning Systems 170, 172, 174, 176 may be an imaging positioning system that captures image data for identifying when the human is positioned at the location.

A determination is made whether a probability of the human being positioned at region $R_n$ is greater than a threshold of probability of the human is at the sound source at location $R_n$: $P_{wp\_}R_n > P_{wp\_}$threshold (S528). Referring to FIG. 1, the position data 190, 192, 194, 196 is used to identify whether a human is positioned at the location of the source of the audio signal, e.g., User 150.

To increase accuracy additional methods may be used to obtain position data and determine correlation between the different methods. In FIG. 5, a third method is used based on using an imaging system to locate a human within the regions, $R_n$. In the third method, image position data is processed to obtain the probability $P_{img\_}R_n$ estimate for each of the regions, $R_1, \ldots, R_n$ (S534). Referring to FIG. 1, Positioning Systems 170, 172, 174, 176 may be an imaging positioning system that captures image data for identifying when the human is positioned at the location. Referring to FIG. 2, generate position data based on wireless signals from wireless devices in the network or image data captured by imaging devices, such as a visible light camera, thermographic camera, etc.

A determination is made whether a probability of the human being positioned at region $R_n$ is greater than a threshold of probability of the human is at the sound source at location $R_n$: $P_{img\_}R_n > P_{img\_}$threshold (S538). However, additional methods may be used to provide additional data that may be analyzed for correlation with the voice source data. A correlation between a greater number of positioning methods and the voice data allows a stronger inference that the sound source and the position produced from the positioning methods are at the same physical location. Referring to FIG. 2 Position Processing System 286 uses Position Estimator 262 to generate position data based on wireless signals from wireless devices in the network or image data captured by imaging devices, such as a visible light camera, thermographic camera, etc.

Then for each region $R_1, \ldots, R_n$ (S540), a determination is made whether the probability of a sound source is at location $R_n$ is greater than a threshold of the probability of the sound source being at location $R_n$: $P_{ssl\_}R_n > P_{ssl\_}$threshold, and one or more of the probability of the human being positioned at region $R_n$ is greater than a threshold of probability of the human is at the sound source at location $R_n$: $P_{wp\_}R_n > P_{wp\_}$threshold, and/or the probability of the human being positioned at region $R_n$ is greater than a threshold of probability of the human is at the sound source at location $R_n$: $P_{img\_}R_n > P_{img\_}$threshold (S550). Voice Source Classifier 266 processes Position Data 224 and Voice Source Data 226 to determine whether the Position Data 224 and the location of the Voice Source Data 226 correlate. If no (S554), the voice command is discarded (S560). If yes (S558), the voice command is processed (S564).

Figure 6:
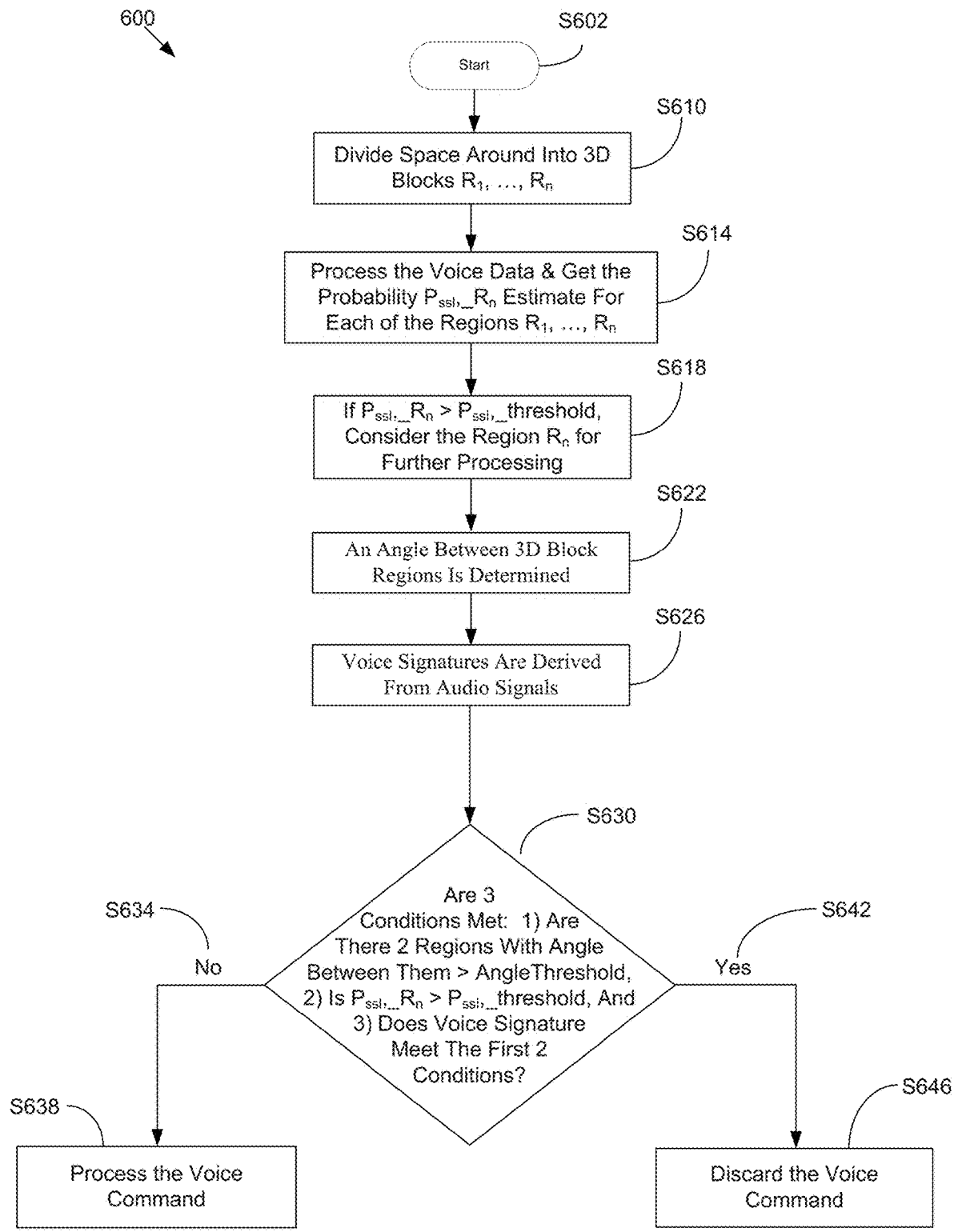
FIG. 6 illustrates a flow chart of a method for deciding that a voice command originated from a non-human source based on calculation of an angle between two regions being greater than an angle threshold.

FIG. 6 illustrates a flow chart 600 of a method for deciding that a voice command originated from a non-human source based on calculation of an angle between two regions being greater than an angle threshold.

In FIG. 6, method 600 starts (S602), and a space around a sound source is divided into three-dimensional (3D) blocks (S610). Referring to FIG. 4, a source of sound 410 is located in an Area 420 defined by an x-axis 430, y-axis 434, and z-axis 438. Area 420 is divided into Three-Dimensional (3D) Block Regions, $R_i$ 440. Sound Source 410 is located in one of the 3D Block Regions, $R_i$, which will be referred to as $R_n$ 450.

The voice data is processed to obtain the probability $P_{ssl\_}R_n$ estimate for each of the 3D regions, $R_1, \ldots, R_n$ (S614). Referring to FIG. 2, Voice Source Processing System 320 obtains voice data associated with audio signals. Sound Source Estimator 324 uses data from audio processing system to produce Voice Source Data 328.

If the probability of a sound source is at location $R_n$ is greater than a threshold of the probability of the sound source being at location $R_n$: $P_{ssl\_}R_n > P_{ssl\_}$threshold, the region $R_n$ is considered for further processing (S618). Referring to FIG. 2, Voice Source Processing System 288 uses Sound Source Estimator 264 to process audio signals and generate Voice Source Data 226.

An angle between the two of the 3D block regions is determined (S622). Referring to FIG. 2, Sound Sensor 284, which includes a microphone array, receives audio signals from a sound source and determines when an angle between regions associated with audio signals exceed an angle threshold.

Voice signatures are derived from the audio signals (S626). Referring again to FIG. 2, Voice Source Processing System 288 uses Sound Source Estimator 264 to process audio signals and generate Voice Source Data 226. Voice Source Data 226 may also include voice signatures derived from the audio signals.

A determination is then made whether three conditions are met (S630). A first condition is determined to occur when an angle between the two of the 3D block regions is greater than an angle threshold, a second condition is determined to occur when the probability of a sound source is at location $R_n$ is greater than a threshold of the probability of the sound source being at location $R_n$: $P_{ssl\_}R_n > P_{ssl\_}$threshold, and a third condition is determined to occur when a command signature from the two of the 3D block regions satisfies the first condition and the second condition. When the three conditions are met, the audio signal may be determined to be from a non-human source. The angle threshold is calculated based on a minimum distance expected between two audio sources, such as a speaker as with a Dolby® setup.

If at least one of the three conditions are not met (S634), the voice command is processed (S638). Due to the angle being less than an angle threshold, a human is probably the source of the sound.

If the three conditions are met (S642), the voice command is discarded (S646). Due to the angle being greater than an angle threshold, a human is probably not the source of the sound.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An audio processing device in a wireless network, comprising:
    a sound sensor;
    a voice source processing system;
    a position processing system;
    a position estimator;
    a memory storing computer-readable instructions; and
    a processor configured to execute the computer-readable instructions to:
        receive, by the sound sensor, one or more audio signals associated with an audio command from a source;
        generate, by the voice source processing system, a voice source data from the one or more audio signals;
        receive data from a positioning system connected to the audio processing device;
        generate, by the position processing system using the position estimator, position data based on the data from the positioning system, wherein the data is associated with a location of the source;
        determine the location based on the voice source data;
        divide an area around the location of the source of the one or more audio signals into three-dimensional (3D) block regions;
        process the one or more audio signals to calculate a probability of the source at a first of the 3D block regions;
        ignore 3D block regions with a probability of presence of the source at the first of the 3D block regions that is less than a probability threshold of the source being at the first of the 3D block regions;
        determine that two of the 3D block regions meet three conditions, a first condition is determined to occur when an angle between the two of the 3D block regions is greater than an angle threshold, a second condition is determined to occur when a probability of the source originating from the two of the 3D block regions is greater than a probability threshold of the source being in the two of the 3D block regions, and a third condition is determined to occur when a command signature from the two of the 3D block regions correlate;
        determine, based on the three conditions being met, that the one or more audio signals originate from a non-human source; and
        discard the audio command.

2. The audio processing device of claim 1, wherein the positioning system comprises one or more of a wireless positioning system that uses wireless signals to determine whether the human is positioned at the location, and an imaging positioning system that captures image data for identifying whether the human is positioned at the location.

3. The audio processing device of claim 1, wherein the processor is further configured to execute the computer readable instructions to:
    determine that the position data and the voice source data do not correlate; and
    identify the audio command as originating from a non-human source based on determining that the position data and the location of the source of the one or more audio signals associated with the audio command does not correlate.

4. The audio processing device of claim 1, wherein the processor determines that the position data and the voice source data do not correlate by:
    determining, from the voice source data, a probability the source is at location Rn and, from the position data, a probability of the human being positioned at region Rn; and
    wherein at least one of the probability of the source is at location Rn is not greater than a threshold of the probability of the source being at location Rn or the probability of the human being at region Rn is not greater than a threshold of probability of the human is at the source at location Rn.

5. The audio processing device of claim 1, wherein the processor is further configured to execute the computer readable instructions to:
    receive, by the sound sensor, one or more other audio signals associated with another audio command from another source;
    generate, by the voice source processing system, another voice source data from the one or more other audio signals;
    receive another data from the positioning system connected to the audio processing device;
    generate, by the position processing system using the position estimator, another position data based on the another data from the positioning system, wherein the another data is associated with another location of the another source;
    determine the another location based on the another voice source data; and
    determine that the one or more other audio signals are from a human source by:
        identifying that the human is positioned at the another location based on the another position data;
        determining that the another position data and the another location correlate based on another voice data probability estimate and another position data probability estimate for each region of the area;
        based on determining that the another position data and the another location correlate, identifying that the another audio command originates from the human positioned at the another location; and
        based on identifying the another audio command as originating from the human, executing the another audio command.

6. The audio processing device of claim 5, wherein the processor is further configured to execute the computer readable instructions to determine that the position data and the location of the source of the one or more audio signals associated with the audio command correlate by:

determining, from the another voice source data, another
probability of another source is at location Rn is greater
than a threshold of the probability of the another source
being at location Rn; and
determining, from the another position data, a probability
of the human being positioned at region Rn is greater
than a threshold of probability of the human is at the
another source at location Rn.

7. The audio processing device of claim 5, wherein the processor is further configured to execute the computer readable instructions to determine that the another position data and the another voice source data correlate by processing another location data received from the positioning system using the position estimator and processing the another voice source data received from the voice source processing system using a sound source estimator.

8. The audio processing device of claim 1, wherein the processor is further configured to execute the computer readable instructions to process the audio command when at least one of the first condition, the second condition, and the third condition is not met, and wherein the angle threshold is calculated based on a minimum distance expected between two audio sources.

9. A method of a network device in a wireless network for classifying a source of an audio signal, comprising:
receiving, by a sound sensor, one or more audio signals associated with an audio command from a source;
generating, by the voice source processing system of the network device, a voice source data from the one or more audio signals;
receiving data from a positioning system connected to the audio processing device;
generating, by a position processing system of the network device using a position estimator of the network device, position data based on the data from the positioning system, wherein the data is associated with a location of the source;
determining the location based on the voice source data;
dividing an area around the location of the source of the one or more audio signals into three-dimensional (3D) block regions;
processing the one or more audio signals to calculate a probability of the source at a first of the 3D block regions;
ignoring 3D block regions with a probability of presence of the source at the first of the 3D block regions that is less than a probability threshold of the source being at the first of the 3D block regions;
determining that two of the 3D block regions meet three conditions, a first condition is determined to occur when an angle between the two of the 3D block regions is greater than an angle threshold, a second condition is determined to occur when a probability of the source originating from the two of the 3D block regions is greater than a probability threshold of the source being in the two of the 3D block regions, and a third condition is determined to occur when a command signature from the two of the 3D block regions correlate;
determining, based on the three conditions being met, that the one or more audio signals originate from a non-human source; and
discarding the audio command.

10. The method of claim 9, wherein the receiving, from the positioning system, location data further comprises one or more of receiving from a wireless positioning system that uses wireless signals to determine whether the human is positioned at the location, and receiving from an imaging positioning system image data for identifying whether the human is positioned at the location.

11. The method of claim 9 further comprising:
determining that the position data and the voice source data do not correlate; and
based on the position data and the location of the source of the one or more audio signals associated with the audio command not correlating, identifying the audio command as originating from a non-human source.

12. The method of claim 9, further comprising:
receiving, by the sound sensor, one or more other audio signals associated with another audio command from another source;
generating, by the voice source processing system, another voice source data from the one or more other audio signals;
receiving another data from the positioning system connected to the audio processing device;
generate, by the position processing system using the position estimator, another position data based on the another data from the positioning system, wherein the another data is associated with another location of the another source;
determine the another location based on the another voice source data; and
determine that the one or more other audio signals are from a human source by:
identifying that the human is positioned at the another location based on the another position data;
determining that the another position data and the another location correlate based on another voice data probability estimate and another position data probability estimate for each region of the area;
based on determining that the another position data and the another location correlate, identifying that the another audio command originates from the human positioned at the another location; and
based on identifying the another audio command as originating from the human, executing the another audio command.

13. The method of claim 12, further comprising:
determining that the position data and the location of the source of the one or more audio signals associated with the audio command correlate by:
determining, from the another voice source data, another probability of another source at location Rn is greater than a threshold of the probability of the another source being at location Rn; and
determining, from the another position data, a probability of the human being positioned at region Rn is greater than a threshold of probability of the human is at the another source at location Rn.

14. The method of claim 9, wherein the determining that the position data and the location of the source of the one or more audio signals associated with the audio command do not correlate further comprises:
determining, from the voice source data, a probability the source is at location Rn and, from the position data, a probability of the human being positioned at region Rn; and
wherein at least one of the probability of the source at location Rn is not greater than a threshold of the probability of the sound source being at location Rn or the probability of the human at region Rn is not greater than a threshold of probability of the human is at the source at location Rn.

15. A non-transitory computer-readable media of a network device in a wireless network having computer-readable instructions stored thereon, which when executed by a processor causes the processor to perform operations comprising:
- receiving, by a sound sensor, one or more audio signals associated with an audio command from a source;
- generating, by a voice source processing system of the network device, a voice source data from the one or more audio signals;
- receiving data from a positioning system connected to the audio processing device;
- generating, by a positioning processing system of the network device using a position estimator of the network device, position data based on the data from the positioning system, wherein the data is associated with a location of the source;
- determine the location based on the voice source data;
- divide an area around the location of the source of the one or more audio signals into three-dimensional (3D) block regions;
- process the one or more audio signals to calculate a probability of the source at a first of the 3D block regions;
- ignore 3D block regions with a probability of presence of the source at the first of the 3D block regions that is less than a probability threshold of the source being at the first of the 3D block regions;
- determine that two of the 3D block regions meet three conditions, a first condition is determined to occur when an angle between the two of the 3D block regions is greater than an angle threshold, a second condition is determined to occur when a probability of the source originating from the two of the 3D block regions is greater than a probability threshold of the source being in the two of the 3D block regions, and a third condition is determined to occur when a command signature from the two of the 3D block regions correlate;
- determine, based on the three conditions being met, that the one or more audio signals originate from a non-human source; and
- discard the audio command.

16. The non-transitory computer-readable media of claim 15, wherein the receiving, from the positioning system, location data further comprises one or more of receiving from a wireless positioning system that uses wireless signals to determine whether the human is positioned at the location, and receiving from an imaging positioning system image data for identifying whether the human is positioned at the location.

17. The non-transitory computer-readable media of claim 15, wherein the computer-readable instructions, when further executed by the processor, cause the processor to perform further operations comprising:
- determining that the position data and the location of the source of the one or more audio signals associated with the audio command do not correlate; and
- based on the position data and the location of the source of the one or more audio signals associated with the audio command not correlating, identifying the audio command as originating from a non-human source.

18. The non-transitory computer-readable media of claim 17, wherein the computer-readable instructions, when further executed by the processor, cause the processor to perform further operations comprising:
- receiving, by the sound sensor, one or more other audio signals associated with another audio command from another source;
- generating, by the voice source processing system, another voice source data from the one or more other audio signals;
- receiving another data from the positioning system connected to the audio processing device;
- generate, by the position processing system using the position estimator, another position data based on the another data from the positioning system, wherein the another data is associated with another location of the another source;
- determine the another location based on the another voice source data; and
- determine that the one or more other audio signals are from a human source by:
  - identifying that the human is positioned at the another location based on the another position data;
  - determining that the another position data and the another location correlate based on another voice data probability estimate and another position data probability estimate for each region of the area;
  - based on determining that the another position data and the another location correlate, identifying that the another audio command originates from the human positioned at the another location; and
  - based on identifying the another audio command as originating from the human, executing the another audio command.

19. The non-transitory computer-readable media of claim 18, wherein the computer-readable instructions stored thereon, when further executed by the processor, cause the processor to perform further operations comprising determining that the position data and the location of the source of the one or more audio signals associated with the audio command correlate by:
- determining, from the another voice source data, another probability of another source is at location Rn is greater than a threshold of the probability of the another source being at location Rn; and
- determining, from the another position data, a probability of the human being positioned at region Rn is greater than a threshold of probability of the human is at the another source at location Rn.

20. The non-transitory computer-readable media of claim 15, wherein the determining that the position data and the location of the source of the one or more audio signals associated with the audio command do not correlate further comprises:
- determining, from the voice source data, a probability the source is at location Rn and, from the position data, a probability of the human being positioned at region Rn; and
- wherein at least one of the probability of the source at location Rn is not greater than a threshold of the probability of the source being at location Rn or the probability of the human at region Rn is not greater than a threshold of probability of the human is at the source at region Rn.

* * * * *